Patented June 18, 1935

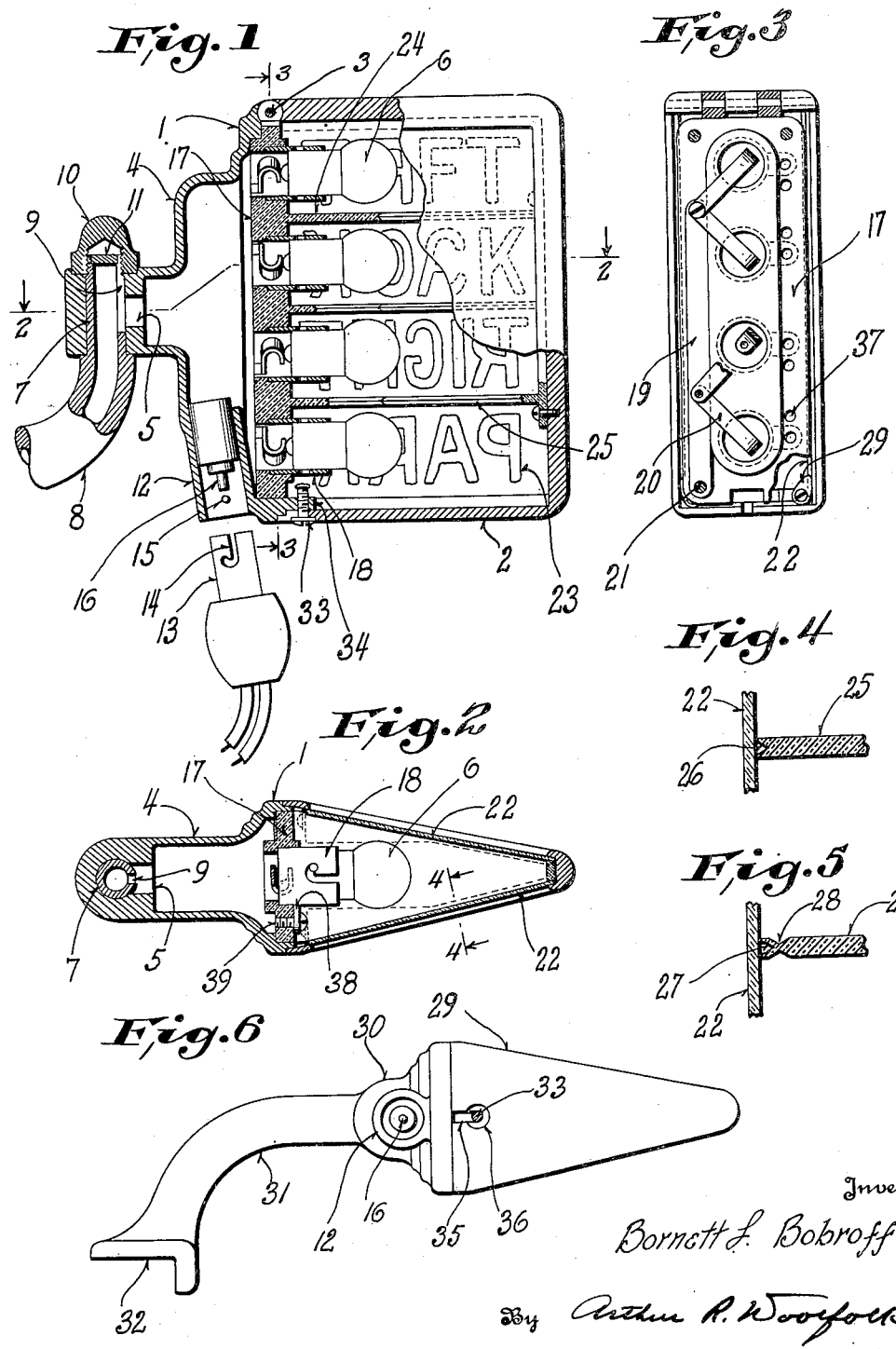

2,005,714

UNITED STATES PATENT OFFICE 2,005,714

SIGNALING DEVICE

Bornett L. Bobroff, Racine, Wis.

Application August 8, 1929, Serial No. 384,319

3 Claims. (Cl. 177—329)

This invention relates to signaling devices and is particularly directed to signaling devices adapted for use on automotive vehicles.

Objects of this invention are to provide novel forms of signal devices which may be secured to opposite sides of an automotive vehicle and which are so constructed that each of the devices presents a front wall and a back wall arranged at an angle to each other so that the planes of the walls form a dihedral angle between them, thus rendering the front wall visible from the front of the vehicle and throughout a wide side angle, and the back wall visible from the rear of the vehicle and throughout a wide side angle, the front and back walls being preferably formed of light transmitting material and having normally invisible designations or insignia thereon, adapted to be selectively rendered visible by the selective lighting of any of a plurality of signal lamps.

Further objects are to provide a construction in which the signal devices may serve, not only in their capacity of signal means, but may replace the usual parking side lights and may thus serve in the additional capacity of parking lights.

This invention is designed to provide signal devices which may be used in any suitable signal system such as that disclosed in my copending application, Serial Number 377,821 filed July 12, 1929 for Signaling systems for automotive vehicles.

In driving automobiles in congested districts, upon highways, at crossings, and at other places, it is desirable that the driver of a vehicle be enabled to signal, not only to following drivers or pedestrians, but also to those at the sides, front and back of his intended direction of travel.

This invention is designed to provide a signal device which may be mounted upon the side of an automotive vehicle, which is so made that it will give signals indicating the intention of the driver, and in which the signals are visible from the front, rear and sides of the vehicle, so that the drivers or pedestrians may accordingly vary or continue their courses without confusion or hesitation.

Further objects are to provide a signal device which is triangular in horizontal cross section, which has front and rear walls provided with designations or insignia and formed of glass or similar material, which is provided with a relatively stationary body portion and with a movable portion, which has triangular or wedge shaped partitions carried jointly by the stationary and movable portions and having interlocking edges, and in which signal lamps are carried by an insulating stationary panel and are free and clear of the partitions carried by the movable portion when the movable portion is being swung to open position.

Further objects are to provide a signal device in which the glass front and rear walls contact with the wedge shaped partitions, in which the partitions are rendered more yielding along their edges than in their body portions, by grooving their edges, or by other means, and in which the partitions are preferably formed of insulating material, such as Bakelite, fibre, etc., so that there is less chance of breaking of the glass by the weakened or yielding edges of the non-metallic partitions which contact with the glass walls.

Further objects are to provide signal devices which may be mounted on opposite sides of an automobile and are provided with downwardly opening portions adapted to receive the plug of a trouble lamp at either side of the vehicle that is most convenient, and which are so constructed that the contact means adapted to cooperate with the trouble lamp plug is housed and protected from rain.

Further objects are to provide a signal device which is attractive and pleasing in appearance, which is of simple and substantial construction, which may be cheaply manufactured, and which has a novel form of locking means for positively locking the movable portion of the casing to the stationary portion.

Further objects are to provide a signal device which, in one form, is provided with a neck having a socket for the reception of a tubular bracket, the neck and tubular bracket being adapted to house the wires to the signal lamp and the bracket being provided with a slit opening through its end to facilitate the positioning and removal of the wires.

Embodiments of the invention are shown in the accompanying drawing in which:

Figure 1 is a side elevation partly in section, of one form of the signaling device.

Figure 2 is a horizontal sectional view on the line 2—2 of Figure 1.

Figure 3 is a vertical sectional view on the line 3—3 of Figure 1, such view showing the insulating panel in full with a corner broken away.

Figure 4 is an enlarged sectional view on the line 4—4 of Figure 2.

Figure 5 is a view corresponding to Figure 4 showing a modified form of construction.

Figure 6 is a bottom view of a further form of the signaling device.

Referring to Figures 1, 2 and 3, it will be seen that the device comprises a casing having a body portion 1 and having a movable portion 2. This movable portion is hinged, by means of the pintle pin 3 adjacent its upper end, to the body portion, as shown in Figures 1 and 3. It is to be noted particularly from Figure 2 that the casing is of triangular horizontal cross section. The movable portion or upwardly swinging portion 2 of the casing and body portion 1 may be formed of metal.

The body portion 1 is provided with a neck 4 which is hollow and provided with an aperture 5 (see Figure 1) through which the wires for the signal lamps 6 may be passed. The neck is also provided with an aperture which receives the reduced extension 7 of a tubular bracket 8. The tubular bracket is provided with a slit 9 through which the wires pass. It is to be noted that the slit 9 opens through the upper end of the tubular bracket and thus facilitates positioning or removal of the wires. For instance, it is apparent that if it is desired to remove the signal device from the bracket, the signal device may be lifted upwardly from the bracket and the wires will slide outwardly through the slit 9. The upper end of the tubular bracket is threaded and receives the clamping nut 10 which locks the signaling device to the bracket.

When the nut 10 is screwed tight it is apparent that there is a tendency to crush or contract the slotted end of the tubular bracket. Consequently, it is preferable to provide a reinforcing disc 11 (see Fig. 1) which fits within and seats upon a shoulder formed in the tubular bracket. This disc closes the upper end of the tubular bracket and prevents the contracting or distortion of the bracket when the nut is screwed tight.

It is to be noted that the neck portion of the casing is provided with a downwardly opening extension 12 which is adapted to receive the plug 13 of a trouble lamp (not shown). The trouble lamp socket is usually provided with a bayonet slot 14 and the portion 12 is preferably provided with a pin 15 adapted to enter the bayonet slot and thus lock the plug in place. Contact means such as indicated at 16 are housed within the portion 12 and are located a material distance upwardly from the bottom of such portion so as to prevent damage from rain, the portion 12 shedding the rain at a point distant from the contact means 16.

The body portion 1 of the casing carries an insulating panel 17 which is apertured and receives the sockets 18 for the signal lamps 6. This insulating panel is provided with a grounding strip 19 to which a plurality of center contacts 20 are attached as may be seen from Figure 3. These center contacts are located immediately rearwardly of the center of the lamps and preferably extend into the rear portion of the apertures for the reception of the lamp sockets. Screws 21 pass through the insulating panel 17 and into the metal body portion 1 of the casing. At least one of the screws passes through the grounding strip 19 and thus insures contact of the grounding strip with the metal portions of the casing, the grounding strip also tending inherently to contact with the metal portion of the casing.

The casing is provided with front and rear light transmitting walls 22 which are preferably formed of glass and which have designations or insignia 23 formed thereon, preferably on their inner surfaces. These designations are normally invisible and are rendered visible when the corresponding lamp 6 is lighted. The designations may be as follows: "Left", "Back", "Right" and "Park".

The casing is divided into a plurality of compartments by means of partitions. These partitions are each formed in two parts. One of the parts, namely the rear portion 24 (see Fig. 1), is preferably formed integrally with the insulating panel 17. The front portions 25 of these partitions are also formed preferably of insulating material. They may be molded or otherwise formed as a unit as is apparent from an examination of Figure 1. The partitions 25 may be attached, by means of screws to the movable portion 2 of the casing. Obviously, the portions 25 may be formed of thin sheet metal if desired.

It is to be noted from Figure 1 that the adjacent portions of the partitions 24 and 25 interlock. One of them may have a V-shaped groove, for example, and the other may have a V-shaped end fitting within the groove when the casing is closed.

The partitions are preferably so formed that their edges are more yielding than their body portions. As shown in Figure 4, this is readily accomplished by providing a groove 26 at their edges so that the feather-edges or thin edges contact with the glass plates or side walls 22.

It is obvious that the edges of the partitions may be weakened in a different manner, if desired. For instance, as shown in Figure 1, the partition 25' is provided with a groove 27 at its edge and with a pair of grooves 28 at its sides adjacent its edge, thus forming relatively yielding fingers or lips which contact with the glass plates or walls 22.

In order to hold the glass walls securely in place against edgewise sliding motion when the casing is open, a pair of flat fingers or latches 29 are secured to the portion 2 as shown in Figure 3 and engage the inner edges of the side plates.

It is apparent that the casing may be attached to the automobile or other automotive vehicle in a different manner from that previously described. For example, the casing shown in Figure 6 and indicated generally by the reference character 29, may be provided with a neck portion 30 which may be formed integrally with a tubular bracket 31. This tubular bracket may have a shouldered foot 32 adapted for attachment to the corner portion of an automobile, preferably adjacent its front.

The locking means for locking the movable portion of either form of the casing, to the stationary or body portion may consist of a headed screw 33 whose shank is threaded into a lip 34 (see Fig. 1) formed integrally with the body portion 1 of the casing. The movable portion of the casing may be provided with a slot 35 (see Fig. 6) for the reception of the shank of the screw and may be provided with a recessed or countersunk hole 36 for the reception of the head of the screw. Obviously, when the screw is loosened, the slot 35 will pass the shank when the device is closed and when the screw is tightened its head seats itself within the recess of 36 (see Fig. 6) and thus positively locks the movable portion against outward or opening motion.

It is apparent that when these devices are applied to opposite sides of an automobile, adjacent the front, that they may replace the parking lights.

In addition to this, it is apparent that inasmuch as the side walls 22 are arranged at an angle to each other, or in other words, as the planes of these walls form a dihedral angle between them, that the front side wall is visible from the front and throughout a wide side angle and that the back wall is visible from the rear and throughout a wide side angle. It is apparent that the signaling device is within easy view of a driver or pedestrian whether he is located to the front or rear of the machine and whether he is on the side either adjacent the front or rear. The converging side walls or, in other words, the forming of the casing in a triangular or wedge shape, gives this signaling range as described above.

Wires have not been shown in the drawing as it is believed the drawings are clear without them. It is to be understood that a group of wires pass through the tubular bracket of the casing, through the neck of the casing, through apertures 31 (see Fig. 3) to the sockets of the signal lights. Preferably, the sockets are provided with rigidly attached tongues 38 which receive the wire clamping screws 39 (see Fig. 2). The screws 39 are threaded into the insulating panel 17 and thus serve to retain the sockets in place, in addition to furnishing an attaching means for the wires. One of the wires goes to the contact means 16 as shown in Figure 1.

It will be seen that a novel form of signal device has been provided by this invention which is pleasant and attractive in appearance, which gives a wide range of side vision, which is readily visible from the front and rear of the automobile, and which is of relatively simple construction.

It will be seen further that by having the partitions between the several signal lamps formed in two sections, one carried by the movable portion of the casing and the other by the stationary portion thereof, that the partition will freely clear the signal lamps when the movable portion of the casing is rocked upwardly or into open position.

Although the invention has been described in considerable detail, it is intended that such description be interpreted as illustrative rather than limiting, as the invention may be variously embodied and is to be interpreted as claimed.

I claim:

1. A signal device comprising a casing having metal parts, an insulating panel carried within said casing and provided with openings, sockets carried within said openings, and insulated from the metal parts of said casing, a grounding strip carried by said panel and contacting with the metal parts of said casing and center contact fingers secured to said grounding strip and having free ends located adjacent the openings in said panel, each of said sockets being electrically distinct from every other socket.

2. A signal device comprising a casing having metal parts, an insulating panel carried within said casing and provided with openings, lamp sockets seated within said openings, and insulated from the metal parts of said casing, metal lugs secured to said sockets, terminal screws passing through said lugs and into said insulating panel, a grounding strip carried by said panel and contacting with the metal parts of said casing, screws passing through said panel and into said casing, one of said screws passing through said grounding strip and into the metal part of said casing, and center contacts secured to said grounding strip and having free ends located adjacent the openings in said panel.

3. A signaling device comprising a casing having a plurality of compartments superposed one above the other and separated by partitions, said casing having a body portion forming one wall of each of said compartments, electric lamps located within said compartments and carried by said body portion, and the top, bottom and sides of the casing being movable as a unit and being hinged adjacent the top to said body portion, said partitions being split with part of said partitions carried by said body portion and the other part of said partitions carried by the said movable unit.

BORNETT L. BOBROFF.